(12) United States Patent
Grace

(10) Patent No.: US 9,310,980 B2
(45) Date of Patent: Apr. 12, 2016

(54) SYSTEMS AND METHODS FOR PERFORMANCE COMPARISONS UTILIZING AN INFINITE CYLINDER USER INTERFACE

(71) Applicant: Mark Grace, Alpharetta, GA (US)

(72) Inventor: Mark Grace, Alpharetta, GA (US)

(73) Assignee: Beyondvia Technologies, Atlanta, GA (US)

( * ) Notice: Subject to any disclaimer, the term of this patent is extended or adjusted under 35 U.S.C. 154(b) by 346 days.

(21) Appl. No.: 14/021,530

(22) Filed: Sep. 9, 2013

(65) Prior Publication Data

US 2014/0059490 A1    Feb. 27, 2014

Related U.S. Application Data

(63) Continuation-in-part of application No. 13/590,550, filed on Aug. 21, 2012.

(51) Int. Cl.
| | |
|---|---|
| *G06F 15/177* | (2006.01) |
| *G06F 3/0484* | (2013.01) |
| *G06F 17/30* | (2006.01) |
| *G06F 3/0481* | (2013.01) |
| *G06Q 10/10* | (2012.01) |
| *G06Q 50/00* | (2012.01) |
| *G06Q 30/02* | (2012.01) |

(52) U.S. Cl.
CPC .......... *G06F 3/04842* (2013.01); *G06F 3/0481* (2013.01); *G06F 17/3089* (2013.01); *G06F 17/30274* (2013.01); *G06Q 10/10* (2013.01); *G06Q 30/02* (2013.01); *G06Q 50/01* (2013.01); *G06F 2203/04802* (2013.01)

(58) Field of Classification Search
None
See application file for complete search history.

(56) References Cited

U.S. PATENT DOCUMENTS

| | | |
|---|---|---|
| 5,819,066 A | 10/1998 | Bromberg et al. |
| 6,141,003 A | 10/2000 | Chor et al. |
| 6,505,212 B2 | 1/2003 | Nakano et al. |
| 6,941,294 B2 | 9/2005 | Flank |
| 7,012,963 B2 | 3/2006 | Zdepski et al. |
| 7,082,573 B2 | 7/2006 | Apparao et al. |
| 7,092,969 B2 | 8/2006 | Meek et al. |
| 7,177,879 B2 | 2/2007 | Flank et al. |
| 7,215,338 B2 * | 5/2007 | Horn .................. A61B 1/00009 345/440 |
| 7,403,657 B2 | 7/2008 | Nagasaka et al. |
| 7,421,470 B2 | 9/2008 | Ludwig et al. |
| 7,421,660 B2 | 9/2008 | Charnock et al. |
| 7,421,690 B2 | 9/2008 | Forstall et al. |
| 7,424,150 B2 | 9/2008 | Cooper et al. |
| 7,424,671 B2 | 9/2008 | Elza et al. |

(Continued)

OTHER PUBLICATIONS

Viegas et al., "Google+ Ripples: A Native Visualization of Information Flow", WWW 2013, May 13-17, 2013, Rio de Janiero, Brazil.

(Continued)

*Primary Examiner* — Omar Abdul-Ali
(74) *Attorney, Agent, or Firm* — Lawrence A. Baratta, Jr.; Christopher L. Bernard; Clements Bernard PLLC

(57) ABSTRACT

A computer-implemented method includes providing one or more data streams; providing one or more target groups for comparison with the one or more data streams; providing a focus format for improving the one or more data streams relative to the one or more target groups; and providing an infinite cylinder user interface for display of data associated with the one or more data streams, the one or more target groups, and the focus format.

17 Claims, 12 Drawing Sheets

(56) References Cited

U.S. PATENT DOCUMENTS

| | | | |
|---|---|---|---|
| 7,424,673 B2 | 9/2008 | Broman et al. | |
| 7,493,640 B1 | 2/2009 | Derrenberger et al. | |
| 7,823,144 B2* | 10/2010 | Pazel | G06F 8/425 |
| | | | 704/243 |
| 8,291,334 B1* | 10/2012 | Castellanos | G06F 8/38 |
| | | | 715/769 |
| 2002/0120701 A1 | 8/2002 | Ohba | |
| 2003/0069801 A1 | 4/2003 | Che-Mponda et al. | |
| 2003/0110517 A1 | 6/2003 | Lee | |
| 2004/0148573 A1 | 7/2004 | Buice et al. | |
| 2005/0027802 A1 | 2/2005 | Madsen et al. | |
| 2005/0193425 A1 | 9/2005 | Sull et al. | |
| 2007/0121146 A1 | 5/2007 | Nesbit et al. | |
| 2007/0174425 A1 | 7/2007 | Gousse et al. | |
| 2007/0195338 A1 | 8/2007 | Brownstein | |
| 2008/0007625 A1 | 1/2008 | Reid et al. | |
| 2008/0060032 A1 | 3/2008 | Toutenhoofd | |
| 2008/0071895 A1 | 3/2008 | Johnson et al. | |
| 2008/0075395 A1 | 3/2008 | Wallace et al. | |
| 2008/0216022 A1 | 9/2008 | Lorch et al. | |
| 2009/0178079 A1 | 7/2009 | Derrenberger et al. | |
| 2010/0269044 A1* | 10/2010 | Ivanyi | G06Q 30/02 |
| | | | 715/736 |
| 2012/0017112 A1* | 1/2012 | Broda | G06F 9/5083 |
| | | | 714/4.4 |
| 2012/0017165 A1* | 1/2012 | Gardner | G06F 17/30899 |
| | | | 715/771 |
| 2013/0054779 A1* | 2/2013 | Cradick | G06F 15/173 |
| | | | 709/224 |

OTHER PUBLICATIONS

Jing et al., "Google Image Swirl", WWW 2012 Companion, Apr. 16-20, 2012, Lyon, France.

Ziemkiewic et al., "Understanding Visualization by Understanding Individual Users".

* cited by examiner

SYSTEMS AND METHODS FOR PERFORMANCE COMPARISONS UTILIZING AN INFINITE CYLINDER USER INTERFACE

CROSS-REFERENCE TO RELATED APPLICATION(S)

The present patent application is a continuation-in-part of U.S. patent application Ser. No. 13/590,550 filed Aug. 21, 2012 and entitled "SYSTEMS AND METHODS FOR DIGITAL IMAGES UTILIZING AN INFINITE CYLINDER USER INTERFACE," the contents of which is incorporated in-full by reference herein.

FIELD OF THE DISCLOSURE

The present disclosure relates generally to computer networking systems and methods. More particularly, the present disclosure relates to systems and methods to improve performance or occurrences based on comparing actual collected data versus a "best" target(s) and using the comparison variances to focus attention and decide to change and then assign responsibility to change and track success, and redo again and again to reach best.

BACKGROUND OF THE DISCLOSURE

Data collection is exploding with the confluence of Internet connectivity, ubiquitous computing devices, increasing processing power, decreasing data storage cost and space, etc. The term "big data" has been coined to define large collections of data that are complex and difficult to process and analyze using conventional systems and methods. It is known in the art that data collection systems feed "control systems," "expert" systems, and accounting systems to make sure that a certain precise activity/flow is followed, over and over again. In (most of) these data collection systems the intent is to remove "fallible, error prone, and devious" human intervention from the system to ensure the system operates "as designed," even though it may be operating below optimal and thus subpar performance. The link between system performance and those responsible for it has been severed, with the only connection being that those responsible may receive alerts, alarms, or other event warnings to say the system is deviating from the designed flow. To find out if the system is suboptimum or needs improvement, a special "off-line" analysis or study needs to be performed. To improve this process from the original design is intended to be very difficult.

Most off-line analytics (i.e. big data) that look at the system to improve it take large amounts of raw data and look for trends, and if the trend points to improvement by statistical methods, the system is "upgraded" or a new algorithm is added. But, by and large the system still operates intentionally disconnected from humans and new target comparisons. In the old world of slow technology change, lacking links to social networks, and reduced complexity systems for laypeople, maybe that worked, but business and people now demand real-time performance systems that allow them to see all data related to target and thus make changes to get to the best in class.

BRIEF SUMMARY OF THE DISCLOSURE

In an exemplary embodiment, a computer-implemented method includes providing one or more data streams; providing one or more target groups for comparison with the one or more data streams; providing a focus format for improving the one or more data streams relative to the one or more target groups; and providing an infinite cylinder user interface for display of data associated with the one or more data streams, the one or more target groups, and the focus format.

In another exemplary embodiment, a system utilizing an infinite cylinder user interface includes a data store for one or more data streams; a network interface communicatively coupled to a network; a processor communicatively coupled to the data store and the network interface; and instructions executable by the processor, and in response to such execution causes the processor to: receive the one or more data streams; provide one or more target groups for comparison with the one or more data streams; provide a focus format for improving variances associated with the one or more data streams relative to the one or more target groups; and provide an infinite cylinder user interface for display of data associated with the one or more data streams, the one or more target groups, and the focus format.

In yet another exemplary embodiment, software stored in a non-transitory computer readable medium and comprising instructions executable by a system, and in response to such execution causes the system to perform operations comprising: providing one or more data streams; providing one or more target groups for comparison with the one or more data streams; providing a focus format for improving the one or more data streams relative to the one or more target groups; and providing an infinite cylinder user interface for display of data associated with the one or more data streams, the one or more target groups, and the focus format.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to systems and methods to improve performance or occurrences based on comparing actual collected data versus a "best" target(s) and using the comparison variances to focus attention and decide to change and then assign responsibility to change and track success, and redo again and again to reach best. Unlike the past closed systems, these systems and methods unite parallel systems of data collection, target comparison, responsibility assignment and effectiveness to display for adaptive attainment of best. Comparisons versus 10 to 50 or more best targets is easily done.

The systems and methods enhance activity/systems/etc. performance by comparing collected actual data (from real time sensor inputs, social media digital, manual forms, existing databases, etc.) and automatically comparing it with target 'best data" (many different targets at same time) and having the resultant variations displayed in a format to allow human focus, with assignment of responsibility to improve, and automatic tracking of improvement, and all improvements made as part of base system, and then the process repeats itself over and over again.

With the various exemplary embodiments described herein, data is presented to users for conveying information thereto. As visual communicators grow both with the various exemplary embodiments described herein and the like, more efficient systems and methods are needed for viewing, selecting, adding, editing, and reading data, especially complex comparison data versus plural targets. Conventional user interfaces include flat spaces in all directions that are too slow, cumbersome, difficult to manage, etc. Thus, systems and methods are described presenting data and comparisons utilizing an infinite cylinder user interface. The infinite cylinder user interface contemplates use on a computer monitor, television, mobile device screen, projector, etc. as an efficient mechanism to present images to comparisons, variances, and related actions to a user such that they can easily track the current day or any day or any trend and the relationships between raw data, targets, variances, action steps, and changes based on action steps, etc.

Figures 1A, 1B:
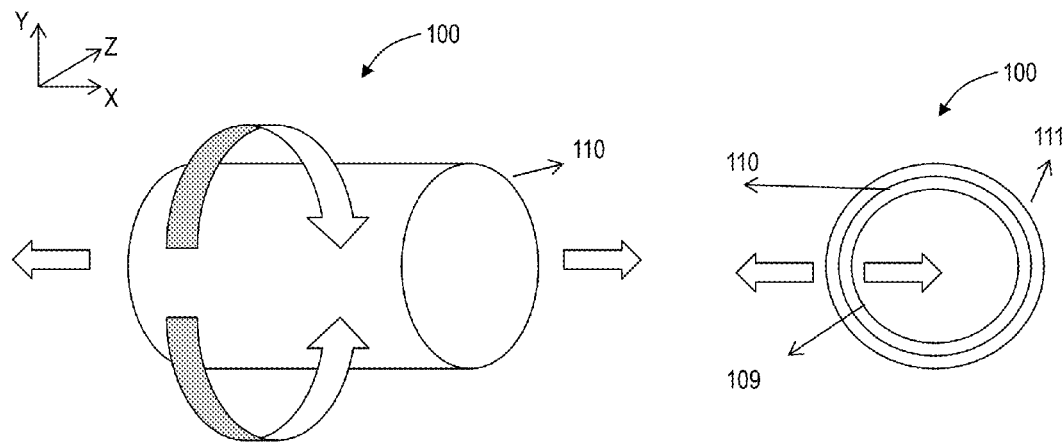
FIGS. 1A-1C are schematic diagrams of an infinite cylinder user interface.
Figure 1C:
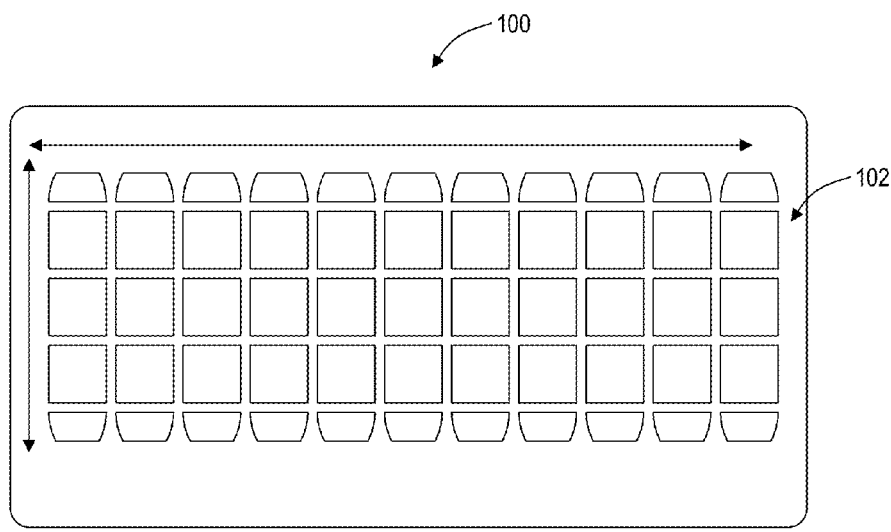

Referring to FIGS. 1A-1C, in an exemplary embodiment, schematic diagrams illustrate an infinite cylinder user interface 100. The infinite cylinder user interface 100 can be presented in any manipulateable visual format to efficiently present data and comparisons to a user. The manipulateable visual formats include any formats where a user can move, select, scroll, drill-down, etc. such as computer screens with associated user inputs, touch screens, etc. FIG. 1A illustrates the infinite cylinder user interface 100 in a conceptual view. Note, in implementation, the infinite cylinder user interface 100 is likely presented through a two-dimensional screen, but the conceptual view is shown to show the various degrees of freedom in presenting data and comparisons to a user through the infinite cylinder user interface 100. FIG. 1B is a cross-sectional view of the perspective view of FIG. 1A. Finally, FIG. 1C is a screen shot view of the infinite cylinder user interface 100.

The perspective view of FIG. 1A illustrates two modes of movement of the infinite cylinder user interface 100. First, the infinite cylinder user interface 100 can be moved along with associated data displayed thereon infinitely along an x-axis in either direction. Second, the infinite cylinder user interface 100 can be spun along the x-axis to show different data thereon. Note, while FIGS. 1A-1B show the cylindrical surface as being finite, the spinning about the x-axis can be infinite or extremely large. The cross-sectional view of FIG. 1B illustrates another mode of movement, i.e. a third mode, where there can be infinite cylinders within cylinders, i.e. drill-down and/or drill-up. For example, assume the cylinder in FIG. 1A is cylinder 110, there can be a cylinder 111 in which cylinder 110 is contained and/or a cylinder 109 that is contained within cylinder 110. Here, the user can drill-down and/or up to move between cylinders. FIG. 1C illustrates the infinite cylinder user interface 100 on a two-dimensional screen. Here, there are plural data sets 102 that are presented in the infinite cylinder user interface 100 and the user can perform any of the three modes of movement to display images on the screen, i.e. longitudinally along the x-axis, spinning about the x-axis, and drilling up and/or down from each cylinder.

Thus, with the infinite cylinder user interface 100, cylinder surfaces can roll in either direction to infinity or stretch lengthwise in either direction to infinity. Cylinders can be inside one another until infinity, and the track from one cylinder to another to another and so on can be followed forward and backward. Cylinders can be related to each other in an infinite pattern to express 1) higher levels of related content and 2) to track all levels of comparison flow. Research has shown that humans are trained, generally, to look at data and comparisons from left to right and with an aspect ratio of about 3:2 for height to length (e.g., most monitors and televisions use 16:9 as an aspect ratio). The infinite cylinder user interface 100 is configured to scroll both height wise and length wise, and in an exemplary embodiment, the infinite cylinder user interface 100 is configured to rotate in about a same rate height and length. In the foregoing descriptions of data collection, target comparison, responsibility assignment and effectiveness to display, it has been determined that the infinite cylinder user interface 100 is an ideal vehicle for display to end users in an easily understandable and comprehensible format. This is a key enabler of target comparisons versus multiple (e.g. 10-50 or more) best targets.

Figure 2:
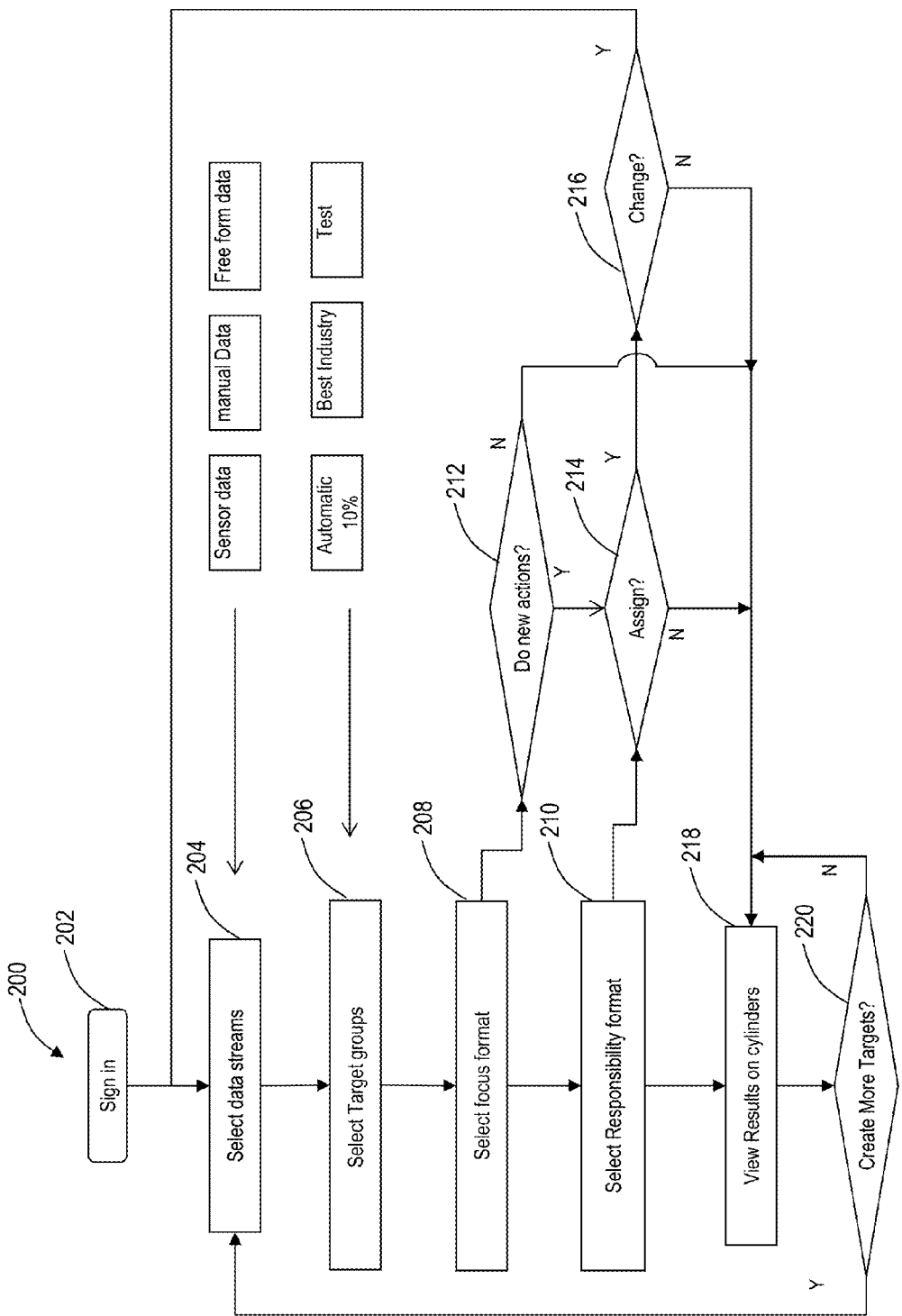
FIG. 2 is a flowchart of a computer-implemented method to improve performance or occurrences based on comparing actual collected data versus a "best" target(s)

Referring to FIG. 2, in an exemplary embodiment, a flowchart illustrates a computer-implemented method 200 to improve performance or occurrences based on comparing actual collected data versus a "best" target(s) and using the comparison variances to focus attention and decide to change and then assign responsibility to change and track success, and redo again and again to reach best. The computer-implemented method 200 includes signing in (step 202). The computer-implemented method 200 can be implemented in a portal, database, on a device, etc. which can be communicatively coupled to one or more data stores. The computer-implemented method 200 can include a multi-user sign in which assigns what areas to view and be responsible for. That is, the computer-implemented method 200 can be operated by a plurality of users via local devices communicatively coupled via a network to a central data store or the like.

The computer-implemented method 200 allows each user to select data streams (step 204). This includes selecting, adding, or viewing data inputs for a variety of activities, areas, functions, etc. In various exemplary embodiments, the computer-implemented method 200 contemplates data from any source such as, without limitation, sensor data, manual data, free form data, etc. The data streams represent the data for comparisons in the computer-implemented method 200. The data streams can relate to financial and accounting data, business analytics, health related information, etc. That is, the data streams can relate to any data that is sought for comparisons and optimization with the computer-implemented method 200. Next, the computer-implemented method 200 selects target groups (step 206). The target groups represent the optimized goal for the data streams and can include, without limitation, a predefined better amount (e.g., +/−10%), a best based on a survey (e.g., best in class, industry, etc.), manually-defined targets, etc. Additionally, a unique aspect of the computer-implemented method 200 is the ease at which plural targets can be selected and viewed in an understanding format with the infinite cylinder user interface 100. As such, the selection of target groups can include multiple targets.

The computer-implemented method 200 includes selecting comparison formats to see the variance and focus (step 208). This step includes configuring the infinite cylinder user interface 100 for display at present as well as over periods of time for running optimizations with the computer-implemented method 200. For example, the step 208 can include all variances on one view to allow focus on most important (e.g., on scalar, dollars & value), a summary of totals, price, and/or volume variances, and the like. The computer-implemented method 200 includes selecting a responsibility format (step 210). This includes assigning principals responsibility for improvement actions as well as how it is displayed. For example, the computer-implemented method 200 can include, after the step 208, determining new actions to perform for improvements (step 212) as well as assigning responsibility for the improvements (step 214) or changing responsibilities/data streams (step 216). Finally, the computer-implemented method 200 includes viewing results on the infinite cylinder user interface 100 (step 218), and optionally updating (step 220).

Figure 3:
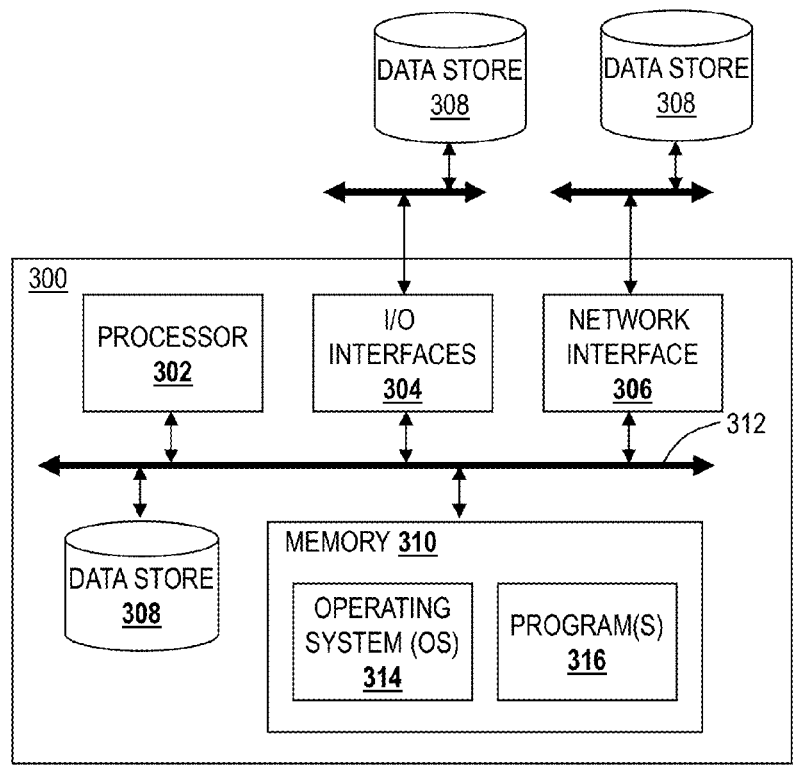
FIG. 3 is a block diagram of a server which may be used with the infinite cylinder user interface of FIG. 1 and the computer-implemented method of FIG. 2.

Referring to FIG. 3, in an exemplary embodiment, a block diagram illustrates a server 300 which may be used with the infinite cylinder user interface 100 and the computer-implemented method 200. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
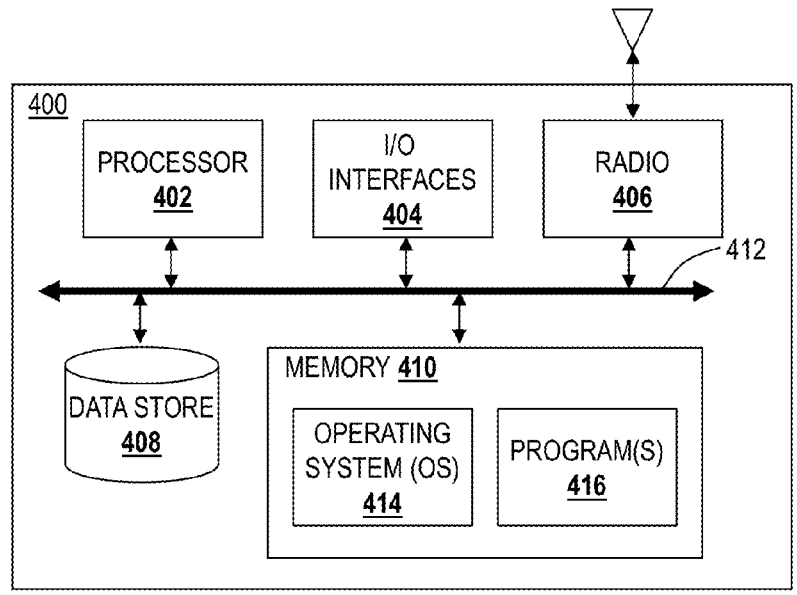
FIG. 4 is a block diagram of a mobile device which may be used with the infinite cylinder user interface of FIG. 1 and the computer-implemented method of FIG. 2.

Referring to FIG. 4, in an exemplary embodiment, a block diagram illustrates a mobile device 400 which may be used with the infinite cylinder user interface 100 and the computer-implemented method 200. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like.

Figure 5:
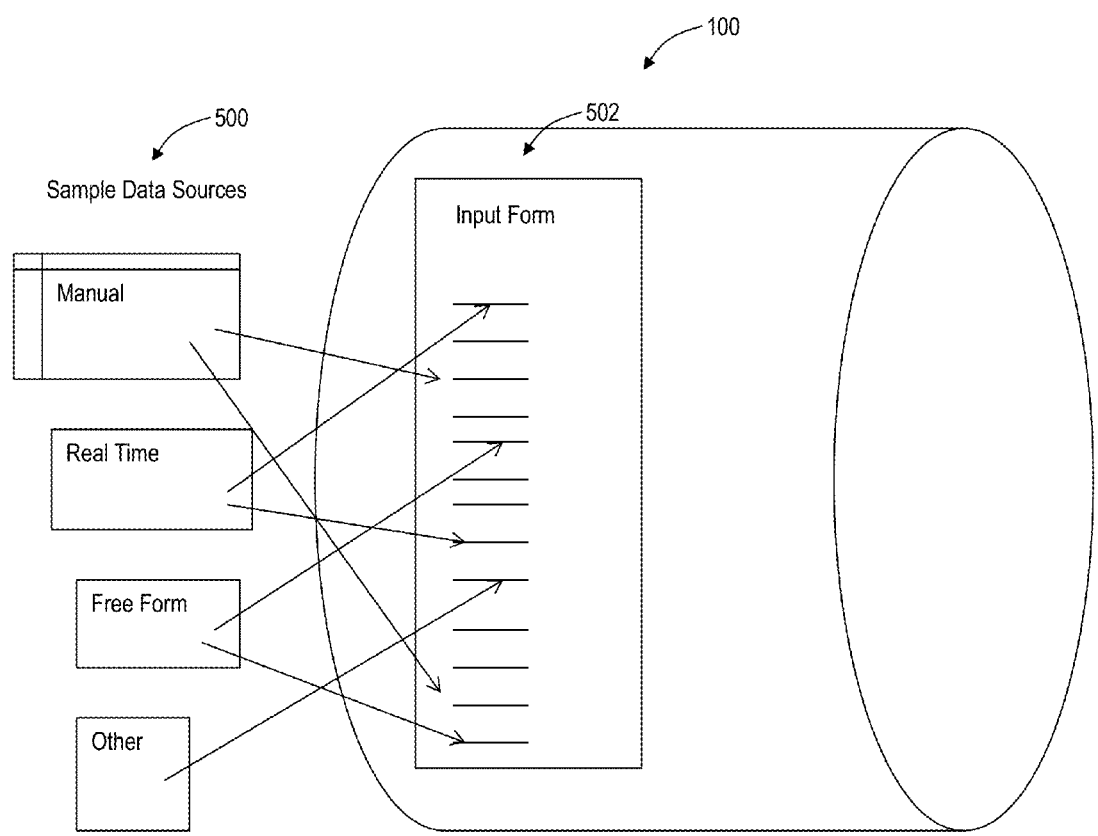
FIG. 5 is a logical diagram of selecting data streams on the infinite cylinder user interface of FIG. 1 with the computer-implemented method of FIG. 2.

Referring to FIG. 5, in an exemplary embodiment, a logical diagram illustrates selecting data streams on the infinite cylinder user interface 100 with the computer-implemented method 200. Specifically, multiple data sources 500 can be selected and input into the infinite cylinder user interface 100. In an exemplary embodiment, the sample data sources 500 can be combined, selected individually or in combination, etc. and they can be placed in an input form 502 in the infinite cylinder user interface 100. In an exemplary embodiment, the input form 502 is displayed in a list or the like about a cylinder in the infinite cylinder user interface 100 such that a user can scroll, infinitely or the like, about the cylinder have plural data sources.

Figure 6:
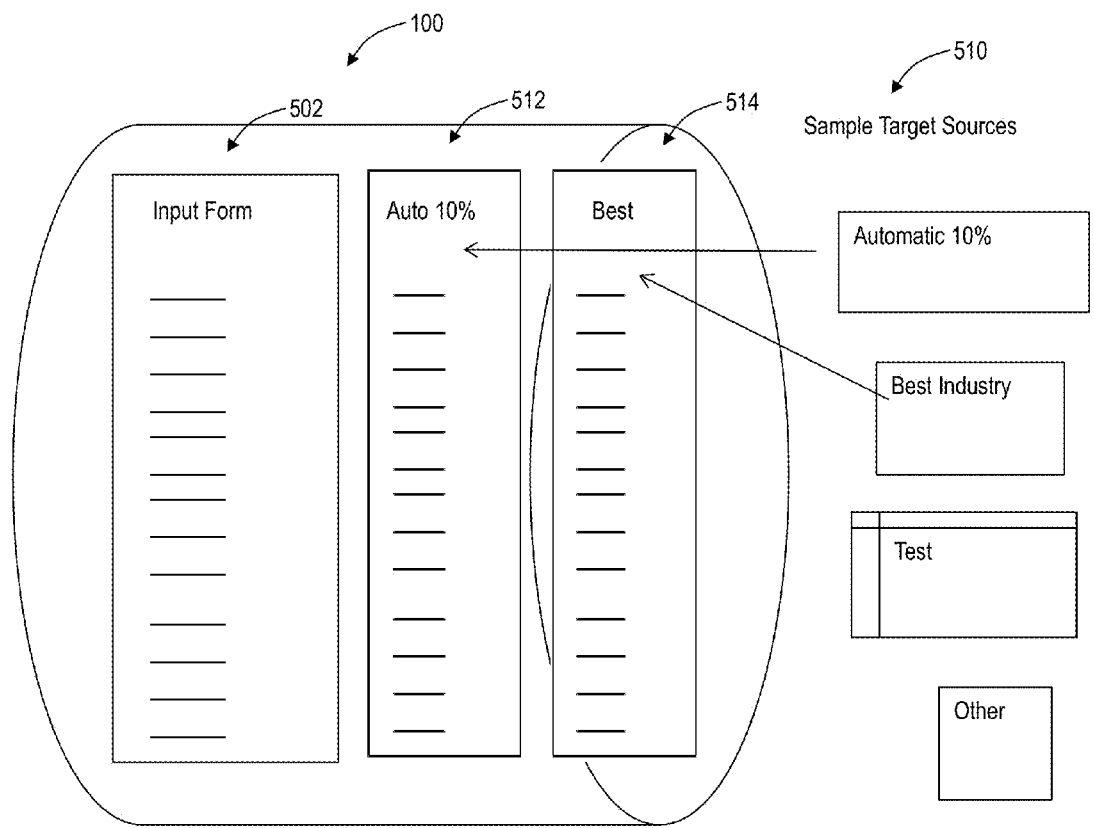
FIG. 6 is a logical diagram of selecting target groups on the infinite cylinder user interface of FIG. 1 with the computer-implemented method of FIG. 2.

Referring to FIG. 6, in an exemplary embodiment, a logical diagram illustrates selecting target groups on the infinite cylinder user interface 100 with the computer-implemented method 200. The infinite cylinder user interface 100 includes the input form 502 from FIG. 5, and includes selected target sources 510 which are displayed adjacent in exemplary forms 512, 514 adjacent to the input form 502 such that each row displays the target source 510 for a corresponding input form 502. In FIG. 6, the infinite cylinder user interface 100 shows taking many different targets and comparing them versus the actual inputs to create variances. One advantage of the infinite cylinder user interface 100 is the ability to display plural target sources 510 next to the input form 502 based on the accessibility of the infinite cylinder user interface 100. For example, FIG. 6 illustrates an automatic 10% improvement target source 512 and a best target source 514 together next to the input form 502.

Figure 7:
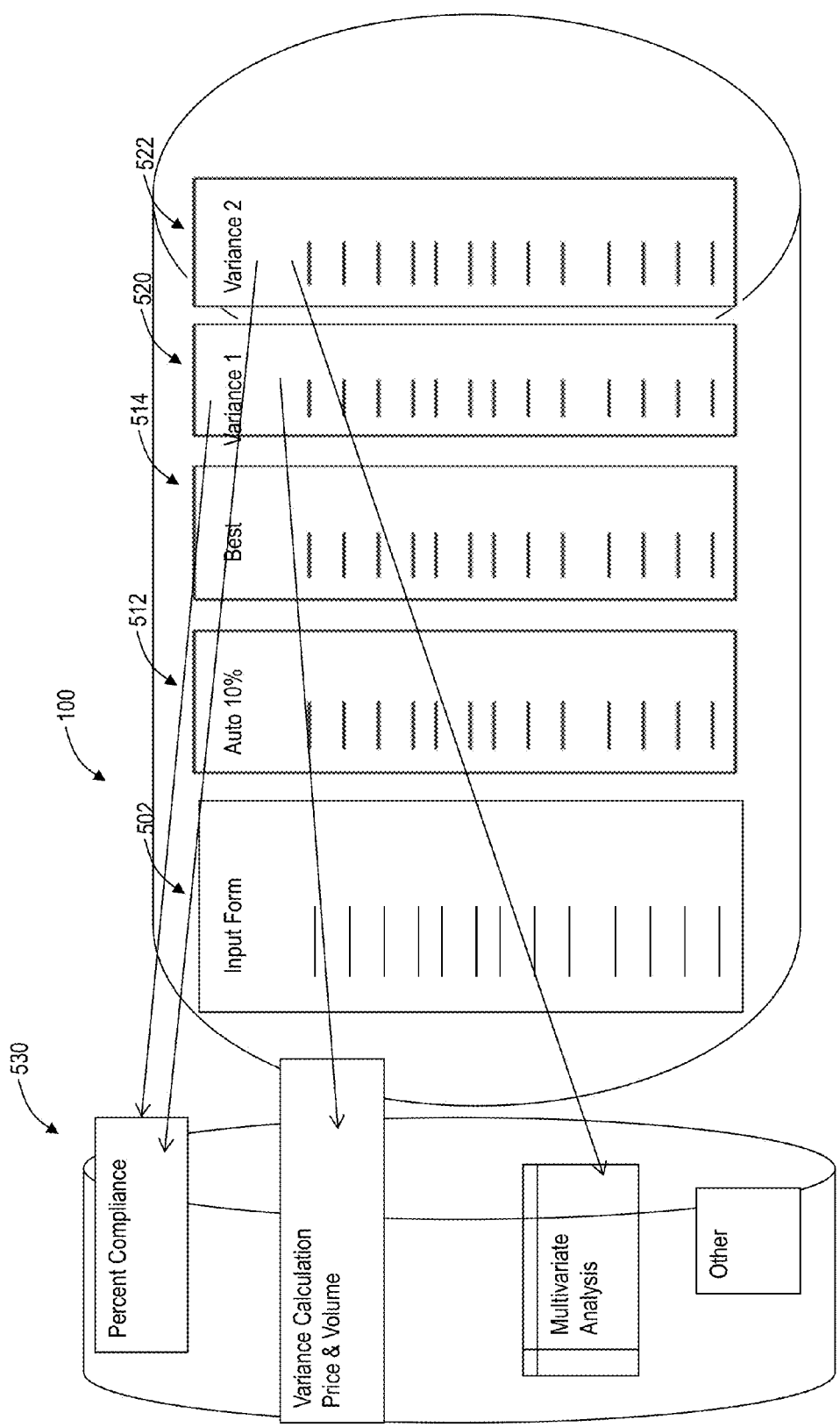
FIG. 7 is a logical diagram of selecting focus formats on the infinite cylinder user interface of FIG. 1 with the computer-implemented method of FIG. 2.

Referring to FIG. 7, in an exemplary embodiment, a logical diagram illustrates selecting focus formats on the infinite cylinder user interface 100 with the computer-implemented method 200. The infinite cylinder user interface 100 includes the input form 502 from FIG. 5 and the target sources 512, 514 from FIG. 6. The infinite cylinder user interface 100 further includes variances 520, 522 which are also displayed adjacent to the input form 502 and the target sources 512, 514. The variances 520, 522 can include any of various variance types 530 such as percent compliance, a variance calculation of price and volume, a multivariate analysis, and the like. Again, one advantage of the infinite cylinder user interface 100 is the ability to display plural target sources 510 and plural variance types 520 next to the input form 502 based on the accessibility of the infinite cylinder user interface 100. Due to the infinite and multi-dimensional scrolling aspects of the infinite cylinder user interface 100, users may easily access large amounts of information.

Figure 8:
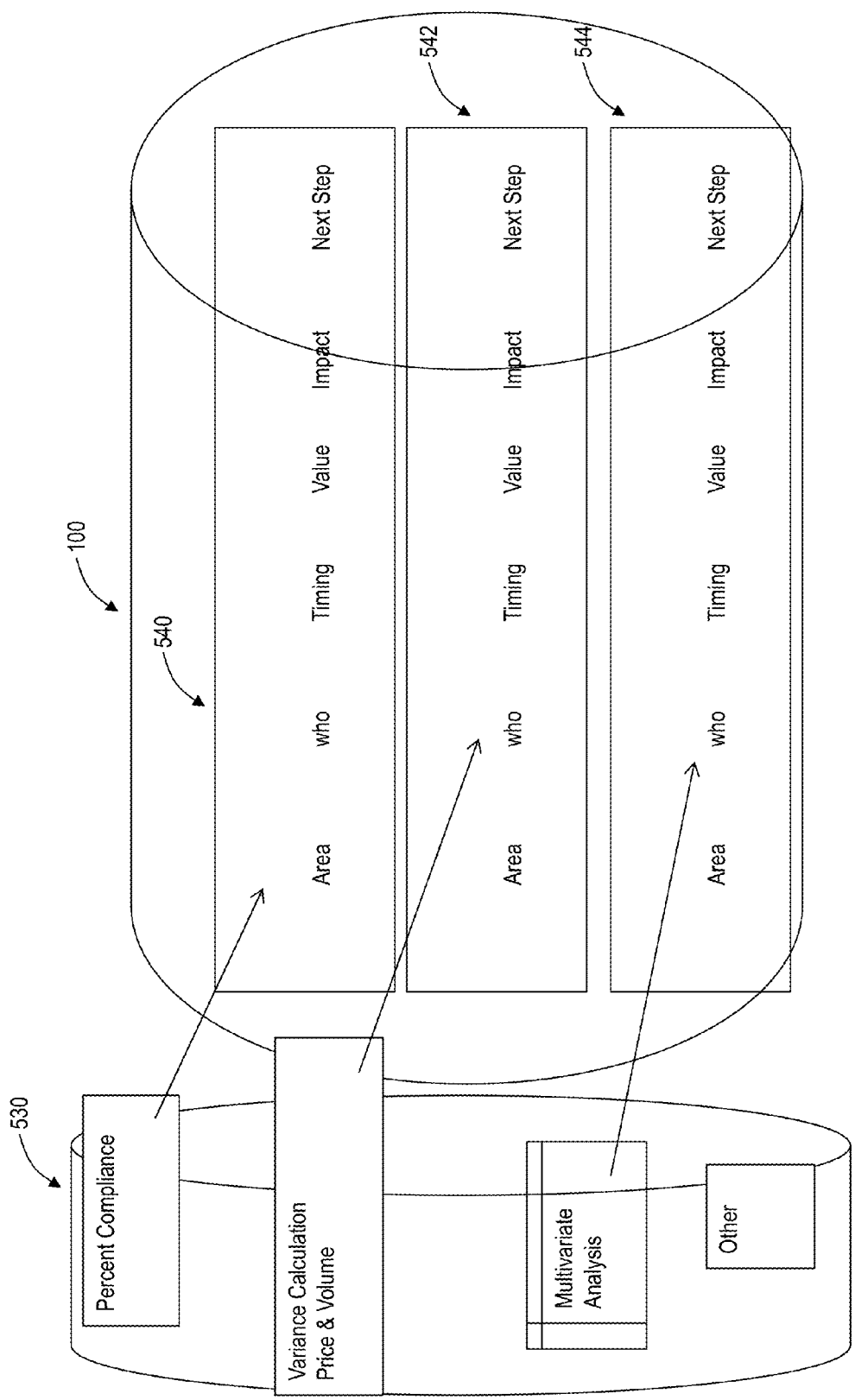
FIG. 8 is a logical diagram of selecting responsibility focus on the infinite cylinder user interface of FIG. 1 with the computer-implemented method of FIG. 2.

Referring to FIG. 8, in an exemplary embodiment, a logical diagram illustrates selecting responsibility focus on the infinite cylinder user interface 100 with the computer-implemented method 200. This includes taking specific areas to improve, and assigning them to someone and then tracking the progress on the infinite cylinder user interface 100. That is, one can assign any of the variances 520, 522 to someone and the focus is displayed on another cylinder separate from the main cylinder in FIGS. 5-7 to show the responsibility focus. In FIG. 7, any of the variances 520, 522 can be selected (i.e., "drilled-down") and shown as responsibility trackers 540, 542, 544 in FIG. 8. Each of the trackers 540, 542, 544 can include various information for tracking progress.

Figure 9:
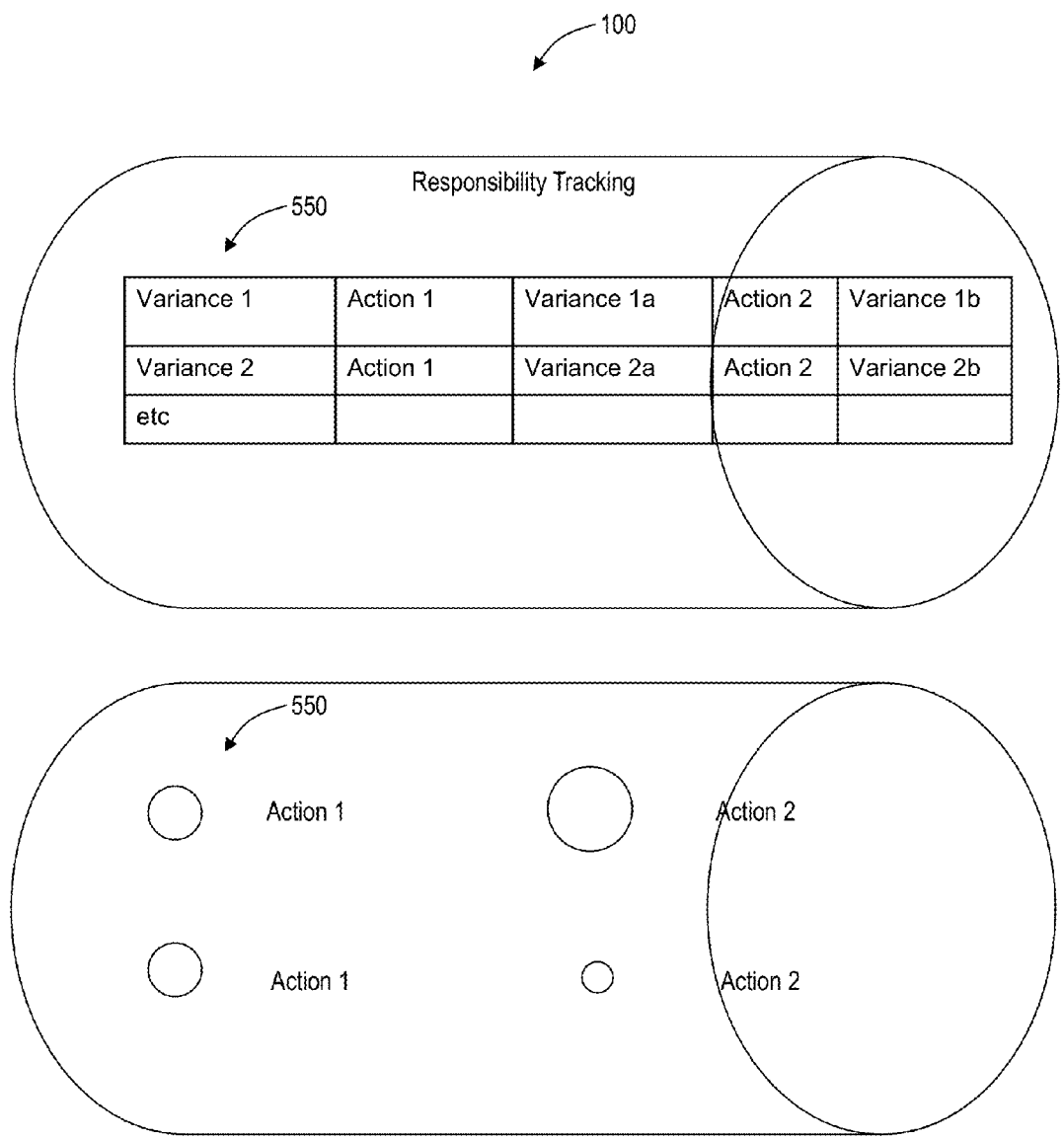
FIG. 9 is a logical diagram of tracking variances through time on the infinite cylinder user interface of FIG. 1 with the computer-implemented method of FIG. 2.

Referring to FIG. 9, in an exemplary embodiment, a logical diagram illustrates tracking variances through time on the infinite cylinder user interface 100 with the computer-implemented method 200. Again, the infinite cylinder user interface 100 conveniently enables an accessible display of information to track responsibilities and progress. For example, the various variances 520, 522 can be displayed over time in tracking progress 550. This can be text, but also can display graphics such as displaying the variances 520, 522 pictorially over time by circles with corresponding magnitudes based on values.

Figure 10:
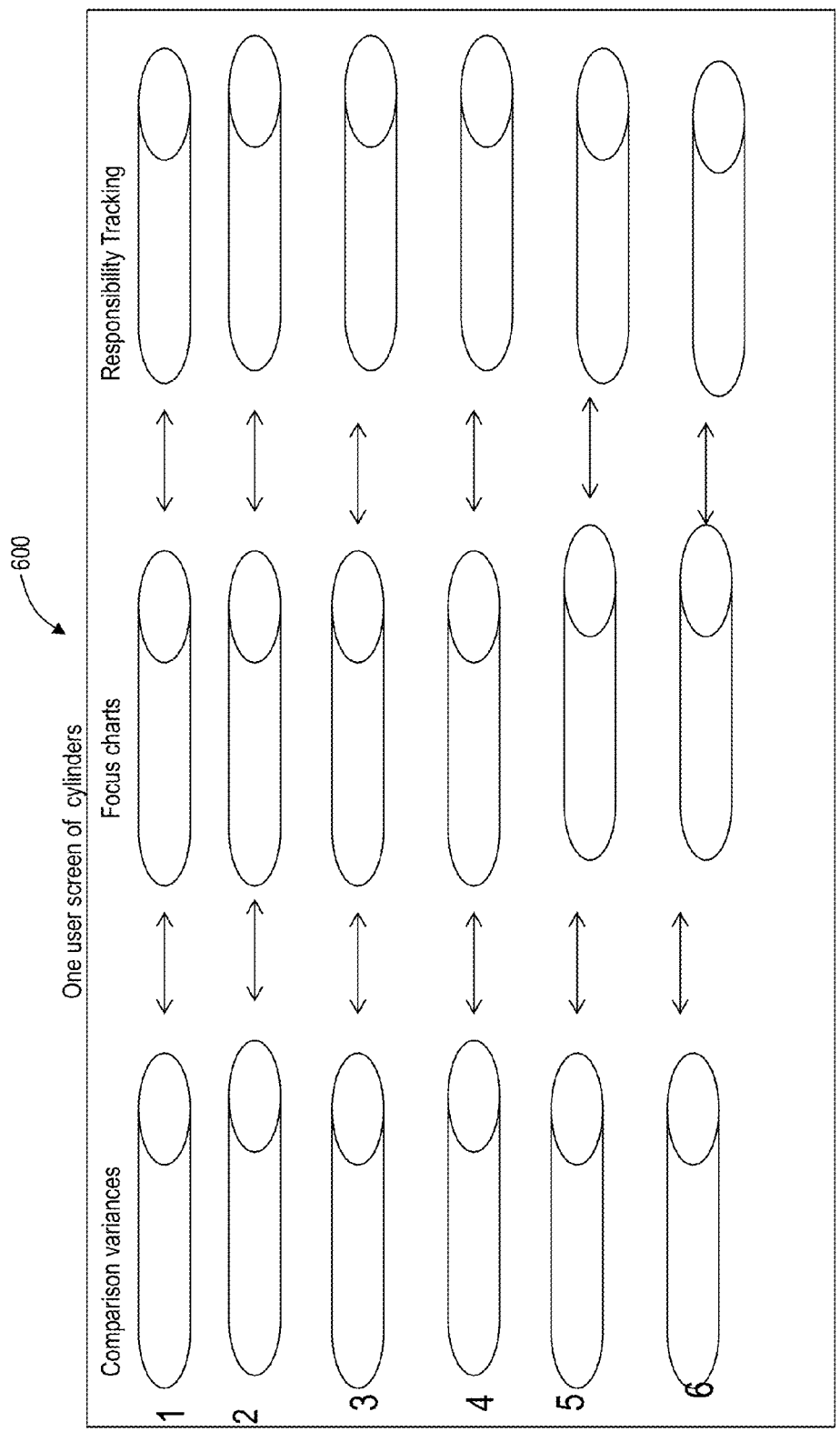
FIG. 10 is a screen diagram of a home screen for a user displaying various infinite cylinder user interfaces of FIG. 1.

Referring to FIG. 10, in an exemplary embodiment, a screen diagram illustrates a home screen 600 for a user displaying various infinite cylinder user interfaces 100. Here, for example, six sets of performance comparisons are shown (of course this could be any number), and a user can utilize the home screen 600 to navigate to a particular infinite cylinder user interface 100.

Figure 11:
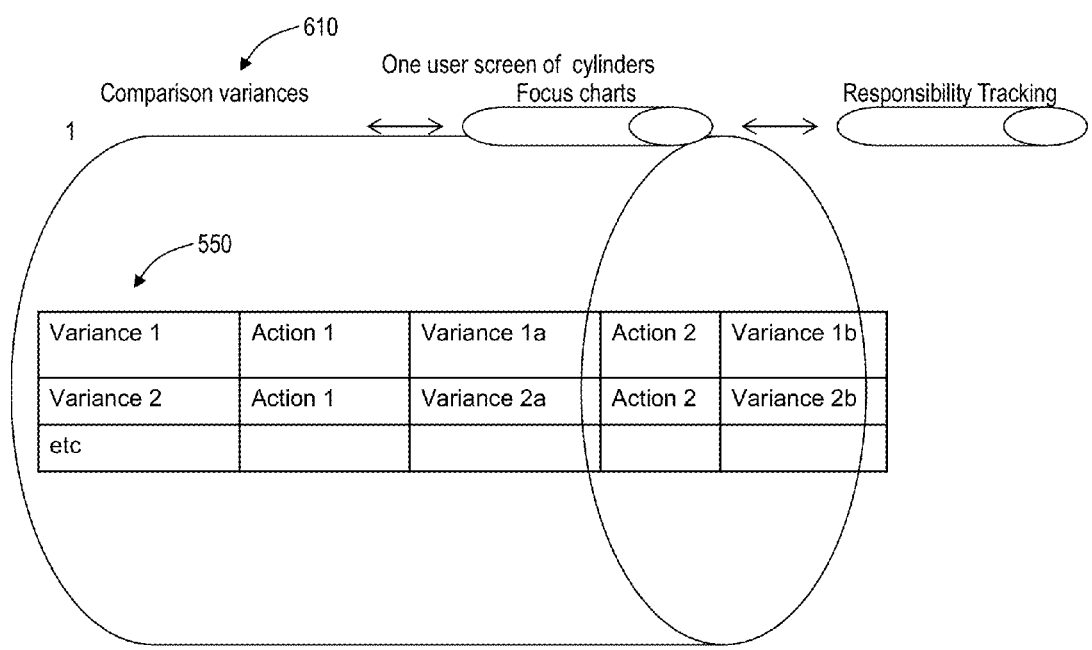
FIGS. 11-13 are logical diagrams illustrate an exemplary flow through one of the sets of data in the home screen of FIG. 10.
Figure 12:
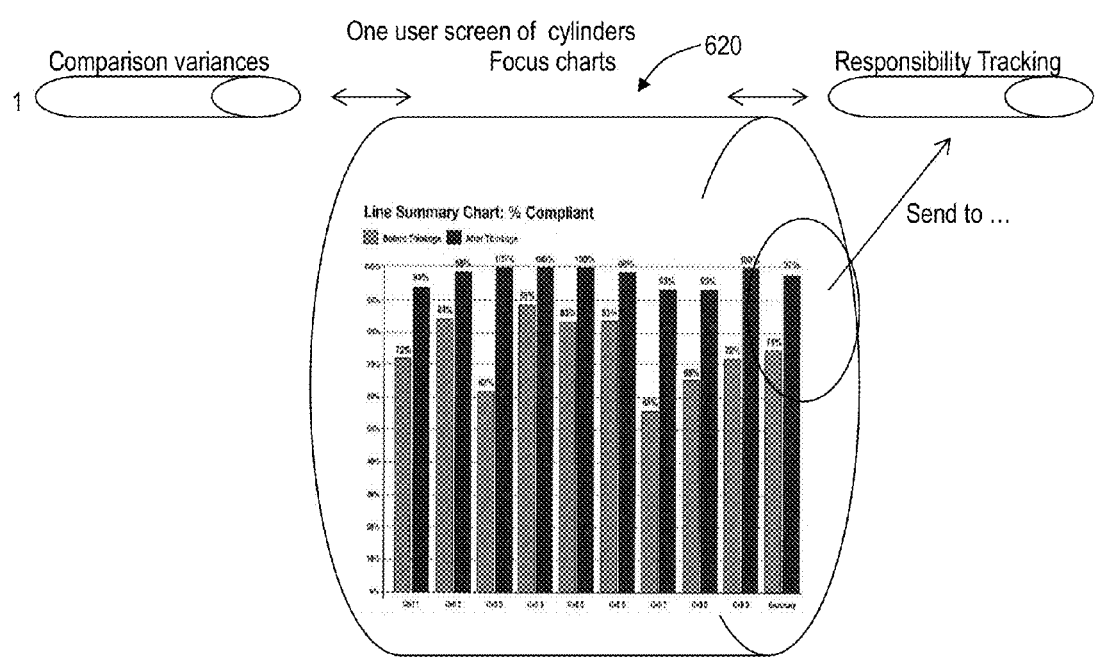
Figure 13:
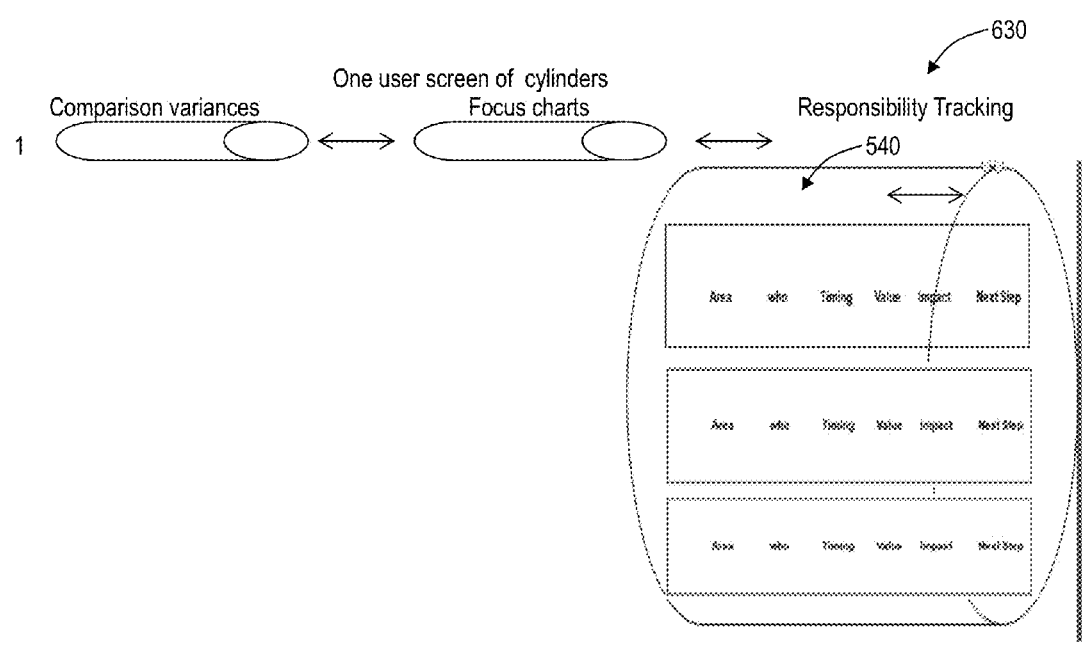

Referring to FIGS. 11-13, in exemplary embodiments, logical diagrams illustrate an exemplary flow through one of the sets of data in the home screen 600. First, in FIG. 11, a cylinder 610 is selected displaying the tracking progress 550. Next, in FIG. 12, one of the tracking progress points is selected bringing up a sample focus chart 620. Finally, in FIG. 13, a point in the focus chart 620 is sent to a responsibility tracker 540 for processing thereof. Again, all of the activity is performed in the infinite cylinder user interface 100.

The infinite cylinder user interface 100 with the computer-implemented method 200 contemplates various areas of use. For example, in business, uses can include operating a plant versus the world wide best target in the "ocean", creating the perfect city and comparing to that, measuring all aspects of the supply chain logistics vs. theoretical best, comparing customer behavior—best buyer, etc. For example, in personal areas, uses can include monitoring health real time vs. perfect male, best friend, your targets, etc., comparing your driving experience real time, connecting to house and making it operate perfectly for temperature, light, smell, etc., shopping versus best dressed in vogue magazine, eating habits, exercise habits, and other habits (programmed best life). For example, in nonprofits, a use could include showing a population vs. the ideal population.

In an exemplary operation, the infinite cylinder user interface 100 with the computer-implemented method 200 can be used operating a manufacturing plant compared to best scenarios and improving. For example, a manufacturing plant wants to compare their performance versus several different targets (FIG. 2, step 202 and FIG. 7) ranging from their best performance ever, to the best in the industry, to the best in a similar industry, and based on the real time (hourly, daily, weekly, monthly, yearly) comparisons they focus on deviations (FIG. 2, step 204 and FIG. 8) where they can do better, so they assign (FIG. 2 step 210 and FIG. 8) these deviations to people/groups to improve these deviations. The system tracks (FIG. 9) their success in managing these deviations noting how their actions impact the deviations in the future.

In another example, a company wants to improve its' labor productivity. Traditionally, they would use their accounting data and prepare a special study or report which can require many hours of data collection and analysis by specially trained experts. With this invention, the plant just selects the key variables (FIG. 5) they feel impact productivity, like labor hours, labor rate, and quantity made (and many more financial and operating variables), and they input those the easiest way into the system to compare versus the selected targets. Referring to FIG. 6, they pick their production data best day ever for each variable and call this target one. In addition, they pick what they feel is the best competitor from their industry, and they enter that as target two. Then they pick the best from a different industry and input this as target three. Now, with the targets picked, they can compare the real time data streams (FIG. 5) with all three targets and focus on the variations they see by looking at the various focus formats (FIG. 7). For example, one focus format shows how close they are to always being within plus or minus 5% of the target value, and if they are not at that level 95% of the time, the system automatically sends the deviations to be tracked in FIG. 8, with the belief to assign responsibility to get them to improve beyond the 95%. Similarly, another focus chart shows traditional price and volume deviations and any deviation above a predetermined value are sent to responsibility charting (FIG. 8). Similarly, another focus chart (i.e. multivariate analysis) shows the relationship between variables to discover if variations can trend together or apart. In addition, some variations can send alarms to the responsibility charting system.

As described, key variations are assigned to people who prepare actions steps to improve the variations and these are tracked in the system (FIGS. 8 and 9) to directly relate the time and the new actions to its' impact on the variance. The best way to display all the relationships is to show them on cylinders (FIG. 10) and see how they all relate together now, and through time. Similar to how a tree tells a story with its rings, each cylinder ring represents a different time and can compare rings of the same time or different times. Cylinder rings may be sorted on variables besides time, such as customer, product code, employee, etc. In this way, the manufacturing plant can push to be the best always, improving beyond the current targets and adding even higher targets whenever they want, just be adding to the process of the computer-implemented method 200.

In another example, to create a perfect city, as population grows in cities, city planning is becoming even more important. To relate all the best variables, such as efficient power, clean water and air, trash pickup, etc., requires a system to collect the variables and compare them to best targets, and assign people to have responsibility to improve the actual to target. So a city may want to improve versus several targets, such as its' best performance from the previous year with 3% better, or to a city twice the size, or to another "perfect" city that a consultant survey devised for their size city. The system here operates just as it did for the manufacturing plant.

In yet another example, for matching to customer profiles, an organization, business or nonprofit, wants to match all of their customers and potential customers to a specific profile as they can serve them better or create better profiles if need be to better serve. So, according to the computer-implemented method 200, the organization selects variables for 15 separate profiles (i.e. targets) and sets values for each variable in the profile, such that each profile is a different target (FIG. 6). As the real data enters the system in FIG. 5, the focus charts (FIG. 7) show how similar the customers are to the various profiles, and by seeing how similar they are to each profile (low variance), they are assigned (FIG. 8) the responsibility as a service person to better serve the customer.

In still yet another example, the computer-implemented method 200 can be for personal use to improve health (or anything else one owns). For example, a person wants to improve their health, so they select the variables they want to improve (FIG. 5) such as weight, heart rate, blood pressure etc. and they enter the data for several targets (FIG. 6). The first target is the data supplied by their doctor. The second target is the data for an athlete in their field taken from published on line search. The third target is from a survey in Men's Health magazine. As with all examples, the actual versus targets send variance information to a responsibility tracking system where the person puts in activities and times for what they want to improve and they see if it is improved or not and they keep making changes to their behavior to get the desired variances.

In a similar example to improving personal health is to improve their personal driving experience when the target is a combination of data about the person and data about the car engine and physical driving performance. Still another example is comparing to the perfect house, by using utilities in the best targeted way and having the perfect livable environment versus target. Another example is to have the best personal style, and compare your look versus other best looks like in Vogue Magazine. This requires the use of a visual system. Obviously, this system can be easily used whenever a user wants to compare actual activity with a target or several target activities.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method, comprising:
providing one or more data streams;
providing one or more target groups for comparison with the one or more data streams;
providing a focus format for improving the one or more data streams relative to the one or more target groups; and
providing a user interface for display of data associated with the one or more data streams, the one or more target groups, and the focus format.

2. The computer-implemented method of claim 1, further comprising:
providing a responsibility format for assigning responsibility to the improving for improving variances with underlying activity associated with the one or more data streams.

3. The computer-implemented method of claim 1, wherein the data streams comprise data obtained by sensors, from manual input, and/or from free form input.

4. The computer-implemented method of claim 1, wherein the one or more target groups comprise a predetermined amount percentage improvement, a best-in-class value, and/or manually input value.

5. The computer-implemented method of claim 1, further comprising:
providing an infinite cylinder user interface for display of data associated with the one or more data streams, the one or more target groups, and the focus format on an ongoing based in time for comparisons thereof.

6. The computer-implemented method of claim 1, further comprising:
comparing plural data streams with plural associated target groups;
determining plural variances of each of the plural data streams with the plural associated target groups; and
displaying the plural data streams with the plural associated target groups and the plural variances in a cylinder on the infinite cylinder user interface.

7. The computer-implemented method of claim 1, wherein the user interface comprises an infinite cylinder user interface which comprises a display with a plurality of movement modes based on user input;
wherein the plurality of movement modes comprise infinite movement longitudinally about an x-axis and infinite rotational movement about the x-axis.

8. The computer-implemented method of claim 7, wherein the plurality of movement modes further comprise drill-down and drill-up movement between a plurality of cylinders.

9. A system utilizing an infinite cylinder user interface, comprising:
a data store for one or more data streams;
a network interface communicatively coupled to a network;

a processor communicatively coupled to the data store and the network interface; and instructions executable by the processor, and in response to such execution causes the processor to:

receive the one or more data streams;

provide one or more target groups for comparison with the one or more data streams;

provide a focus format for improving variances associated with the one or more data streams relative to the one or more target groups; and provide a user interface for display of data associated with the one or more data streams, the one or more target groups, and the focus format.

10. The system of claim 9, wherein, in response to execution of the instructions, the instruction further cause the processor to:

provide a responsibility format for assigning responsibility to the improving.

11. The system of claim 9, wherein the data streams comprise data obtained by sensors, from manual input, and/or from free form input.

12. The system of claim 9, wherein the one or more target groups comprise a predetermined amount percentage improvement, a best-in-class value, and/or manually input value.

13. The system of claim 9, wherein, in response to execution of the instructions, the instruction further cause the processor to:

provide an infinite cylinder user interface for display of data associated with the one or more data streams, the one or more target groups, and the focus format on an ongoing based in time for comparisons thereof.

14. The system of claim 9, wherein, in response to execution of the instructions, the instruction further cause the processor to:

compare plural data streams with plural associated target groups;

determine plural variances of each of the plural data streams with the plural associated target groups; and display the plural data streams with the plural associated target groups and the plural variances in a cylinder on the infinite cylinder user interface.

15. The system of claim 9, wherein the infinite cylinder user interface comprises a display with a plurality of movement modes based on user input;

wherein the plurality of movement modes comprise infinite movement longitudinally about an x-axis and infinite rotational movement about the x-axis.

16. The system of claim 15, wherein the plurality of movement modes further comprise drill-down and drill-up movement between a plurality of cylinders.

17. Software stored in a non-transitory computer readable medium and comprising instructions executable by a system, and in response to such execution causes the system to perform operations comprising:

providing one or more data streams;

providing one or more target groups for comparison with the one or more data streams;

providing a focus format for improving the one or more data streams relative to the one or more target groups; and providing an infinite cylinder user interface for display of data associated with the one or more data streams, the one or more target groups, and the focus format.

* * * * *